Oct. 29, 1940.　　H. E. SLOAN ET AL　　2,219,851
CHUCK INCLUDING OPERATING MECHANISM THEREFOR
Filed May 31, 1938　　3 Sheets-Sheet 1
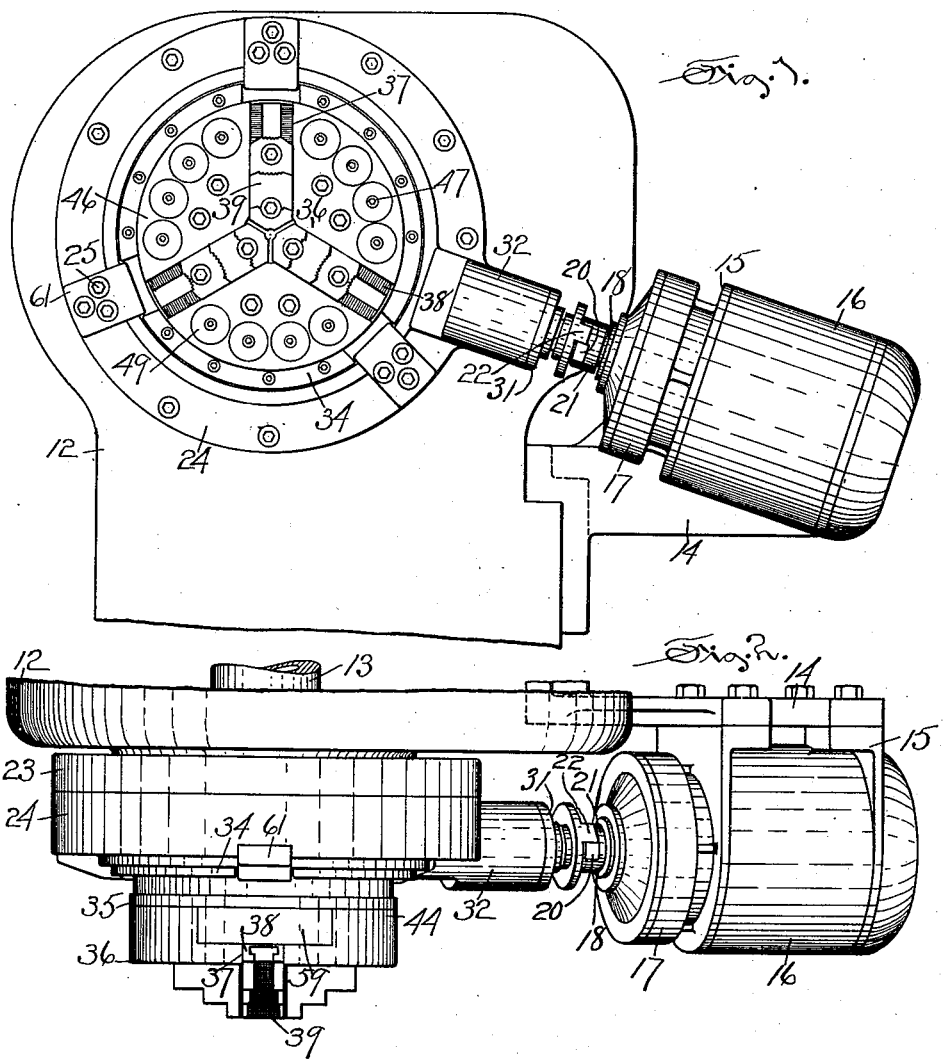

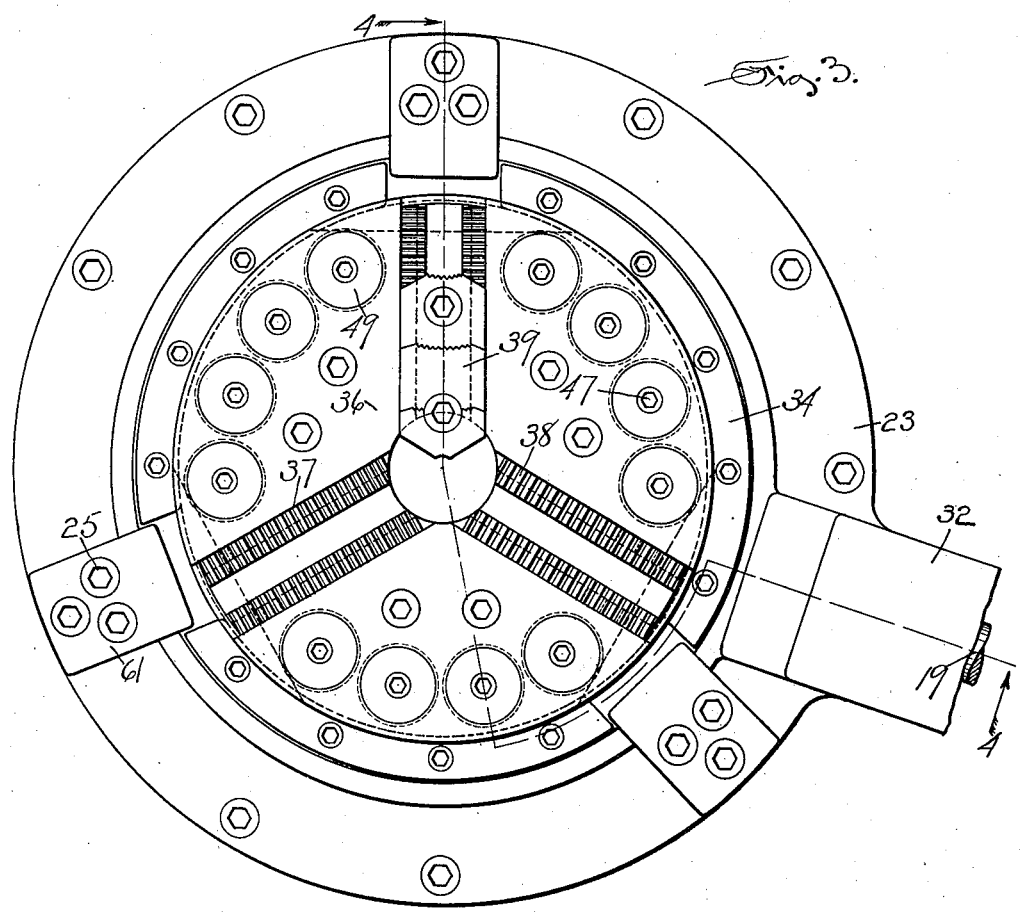
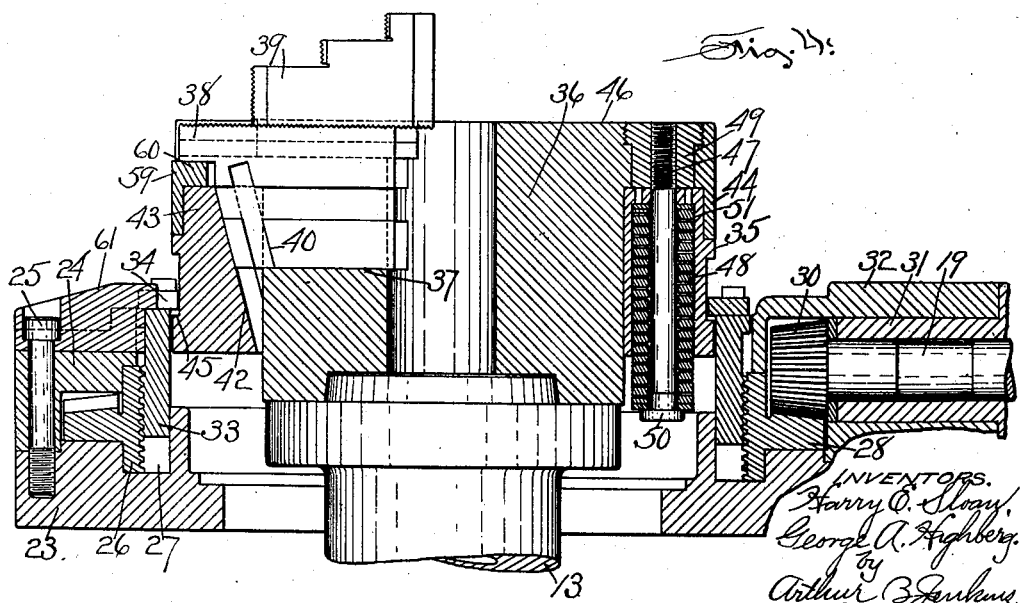

Oct. 29, 1940.  H. E. SLOAN ET AL  2,219,851
CHUCK INCLUDING OPERATING MECHANISM THEREFOR
Filed May 31, 1938   3 Sheets-Sheet 3
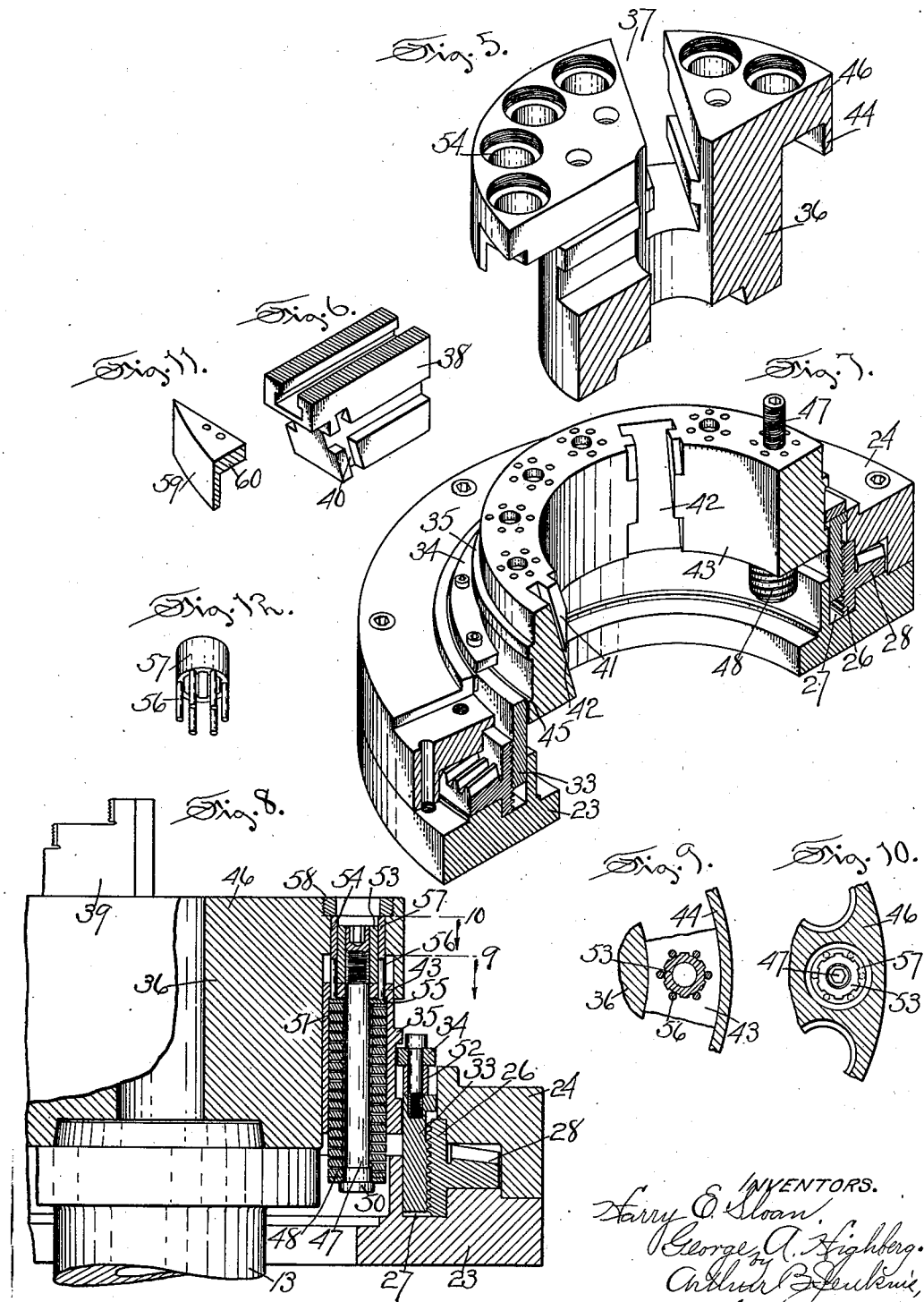

Patented Oct. 29, 1940

2,219,851

UNITED STATES PATENT OFFICE 2,219,851

CHUCK INCLUDING OPERATING MECHANISM THEREFOR

Harry E. Sloan, Hartford, and George A. Highberg, West Hartford, Conn., assignors to The Cushman Chuck Company, Hartford, Conn., a corporation of Connecticut Application May 31, 1938, Serial No. 210,824

13 Claims. (Cl. 279—110)

Our invention relates more particularly to that class of chucks comprising chuck jaws movable radially on the faces of the chucks, and an object of our invention, among others, is the production of a chuck of this type having a wide range of operations and that shall be particularly efficient in the results obtained from its use.

One form of a chuck embodying our invention and in the construction and use of which the objects herein set out, as well as others, may be attained as illustrated in the accompanying drawings in which—

Figure 1 is a view in front elevation of a chuck and operating mechanism therefor embodying our invention.

Figure 2 is a top view of the same.

Figure 3 is a face view on enlarged scale to clearly disclose the construction.

Figure 4 is a view in section on a plane denoted by the dotted line 4—4 of Fig. 3.

Figure 5 is an isometric perspective view of the chuck body cut in central longitudinal section.

Figure 6 is a similar view of one of the chuck jaw carriers.

Figure 7 is another similar view of the device as shown in Fig. 4 but with the chuck body removed.

Figure 8 is a view in central longitudinal section of a portion of the device illustrating a modified form.

Figure 9 is a detail view in section on a plane denoted by the dotted line 9 of Figure 8.

Figure 10 is a similar view on a plane denoted by the dotted line 10 of Figure 8.

Figure 11 is an isometric perspective view of a fragment of one of the fillers for closing cuts in the chuck jaw actuator.

Figure 12 is a similar view of the compression sleeve and compression pins projecting therefrom.

In the accompanying drawings the numeral 12 denotes a supporting frame for our improved chuck operating mechanism including means for opening and closing the chuck jaws, this frame being of any suitable construction for supporting a chuck spindle 13, the details of construction of the spindle mount being omitted from the description and drawings herein as not necessary to a full understanding of the invention, as such details will be readily understood by those skilled in the construction and operation of chucks of this type.

A motor supporting bracket including a base 14 is rigidly secured to the frame 12, projecting therefrom at one side as shown in Figs. 1 and 2 of the drawings. This bracket includes supporting plates 15 projecting substantially at right angles to the base and a motor 16 is mounted on said plates. This motor may be of any suitable type common to such structures and may include suitable reduction gearing mounted in a gear case 17 from which a driving shaft 18 projects, this spindle having a loose connection with a chuck jaw operating spindle 19, this connection comprising a lug or lugs 20 projecting from a collar 21 secured to the shaft 18 in position to strike a lug or lugs 22 rigidly supported by the spindle 19 to impart a hammer blow for the purpose of loosening the grip of the chuck jaws should they chance to stick or cling to the work.

All of the parts thus far described are of old and well-known construction and a further and more detailed description is therefore omitted herein, the construction and operation being readily understood by those skilled in the art.

A base ring 23 is firmly secured to the frame 12, as by means of screw bolts, or otherwise, and a cover ring 24 is secured to the base ring as by means of screw bolts 25 which are also employed to secure other parts to be hereinafter described. A jaw operating band 26 is mounted in a groove 27 in the base ring 23, as shown in Figs. 7 and 8 of the drawings, and a jaw operating gear 28 is carried by said band, said gear comprising a toothed flange projecting from the outer surface of the band between its opposite edges. A cover ring 24 is secured to the base ring 23 to enclose said band and the gear and other parts to be hereinafter described. A jaw operating pinion 30 is secured to the spindle 19 and meshes with the teeth of the gear 28, as shown in Fig. 4 of the drawings. As shown in this figure the spindle 19 is mounted in a sleeve 31 located within a housing 32 secured to and projecting from one side of the cover ring 24 as shown in Figs. 3 and 4 of the drawings, the lugs 22 hereinbefore referred to being secured to the spindle 19.

The inner surface of the jaw operating band 26 is threaded and engages the threaded outer surface of a jaw operating ring 33 located in the groove 27 in the base ring. Lips 34 in the form of segments are secured to the upper edge of the ring 33, said lips overhanging the inner surface of said ring and as shown in Figs. 4 and 7 of the drawings. A chuck comprising a chuck body 36 is secured to the spindle 13 in any suitable manner, as by means of screw bolts, radial grooves 37 being formed in the body for the reception of chuck jaw carriers 38 to which chuck jaws 39 are secured in any common and well-known manner. The grooves 37 and the carriers 38 are provided with intermeshing ribs and grooves on opposite sides and in a manner common to chucks of this type, as clearly shown in Figs. 5 and 6 of the drawings, and a more detailed description is therefore omitted herein. Said carriers, however, are provided on opposite sides with inclined grooves 40 to receive ribs 41 formed on opposite sides of grooves 42 on the inner wall of an annular chuck jaw actuator 43. This actuator is formed to fit at its lower end within the jaw operating ring 33 and at its upper end within an annular recess created by an overhanging flange 44 comprising a portion of the chuck body 36. Said actuator has a sliding movement upon the chuck body 36, such sliding movement in one direction being obtained by means of an annular shoulder 45 on the lower end of the actuator that is engaged by the lips 34 on the operating ring 33. This actuator is suspended from the projecting top 46 comprising part of the chuck body by means of bolts 47 and springs 48, the bolts being threaded into bushings 49 screw threadedly secured to the top 46 as shown in Fig. 4 of the drawings. The springs are seated against heads 50 of the bolts and are located in recesses 51 extending inwardly from the inner end of the actuator. The springs act to force the actuator outwardly within the recess created by the flange 44 and within the ring 33.

In the operation of the device thus far described when it is desired to open the chuck jaws to release a piece of work held between them, the motor is started in any ordinary manner, as by means of a push button or other starting device, which will rotate the motor in the proper direction to rotate the spindle 19, pinion 30, gear 28 and band 26 in a direction to move the jaw operating ring 33 inwardly causing engagement of the lips 34 with the shoulder 45 thereby drawing the actuator 43 inwardly against the tension of the springs 48. This will cause the chuck jaw carriers 38 and chuck jaws 39 mounted thereon to open radially outwardly. The motor being of a type that will rotate its shaft in opposite directions, operation of another device, as a push button, will rotate the motor in such opposite direction, thereby rotating the spindle 19, pinion 30, gear 28 and band 26 in the opposite direction from that above described, thereby moving the ring 33 outwardly to release the actuator and permit the springs 48 to move it outwardly, said springs thus effecting movement of the jaw carriers and jaws inwardly to grip a piece of work, and thereby determine the amount of grip that will be exerted by the jaws. Release of the switch closing device, as the push button, will stop operation of the motor and movement of the chuck jaws, but by holding the push button closed until motor stalls, the sleeve 33 will stop in its outward movement on engaging the clips 61 and in its inward movement on engaging the base ring 23. In this case the actuator 43 will travel its maximum distance, but if the jaws 39 are adjusted so that they grip a piece of work the actuator 43 will move something less than its maximum movement and the grip will be anything for which the springs 48 have been adjusted. It will be noted that gripping pressure on work may be varied by changing the adjustment of the individual springs 48 by rotating the screws 50.

The chuck thus far described operates to move the chuck jaws radially inward to grip a piece of work located between their inner ends, whereas in Figure 8 the chuck is shown equipped to grip a piece of work, as a ring encircling the jaws, by movement of said jaws radially outward. As thus equipped the flange lips 34 are positioned by means of spacers 52 in the form of collars seated upon the operating ring 33 so that they will contact with a shoulder formed by a rib 35 extending around the actuator, thus moving the actuator outwardly and the chuck jaw carriers and the chuck jaws thereon radially inward to release a piece of work. This movement of the actuator forces a number of screw threaded bushings 53, distributed about the chuck body in the holes 54, outwardly thereby carrying the spring supporting bolts 47 outwardly to compress the springs 48, said bolts being screw threadedly engaged with the bushings 53, it being noted that these are the same bolts that engage the bushings 49 in the other structure. Compression of the springs is secured by means of compression plates 55 against which the springs are seated in the recesses 51, said plates being in contact with compression pins 56 preferably integrally formed with and projecting from one edge of compression sleeves 57 abutting against bushings 58 screw threadedly engaged in the mouths of the openings 54, said pins extending through holes in the bottoms of said recesses and into contact with said plates, as shown in Figure 8 of the drawings. The bushings 53 and the compression sleeves 57 have ribbed and grooved meeting surfaces as shown in Fig. 10, this being for the purpose of preventing turning movement of the bushings 53 when the bolts 47 are turned by means of a socket wrench in sockets in the ends of the bolts to loosen the latter or for varying the tension of the springs.

In the construction of the device shown in Fig. 8 it will be noted that the bushings 49 in the structure first described are replaced by the sleeves 57, pins 56, compression plates 55, and bushings 53, and the spacers 52 are provided to position the flange lips 34 for the operation of the jaws to grip the work by outward movement as hereinbefore explained.

The radial grooves 37 are cut through from the central hole in the chuck body 36 to the outer surface thereof, and in order to close the openings thus made and preserve the continuity of the outer surface of the chuck body fillers 59 are secured to the chuck body, as shown in Figures 2 and 4 of the drawings, screws passed through holes in lips 60 on the fillers being employed for this purpose.

Clips 61 are secured in recesses in the cover 24 as by means of the bolts 25 hereinbefore referred to, said clips having their edges overhanging the jaw operating ring 33 to limit its outward movement as shown in Fig. 4 of the drawings.

We claim:

1. In combination, a rotatably mounted chuck body, chuck jaws movably mounted thereon, a movably mounted chuck jaw actuating member of annular form slidably mounted upon the chuck body and operatively connected with said jaws, a member for operating said actuating member, said members having means comprising a lip on one member extending into a groove wider than said lip on the other member for operative engagement during movement of one of said members in one direction only, means for moving said member in the opposite direction, a motor mounted in a stationary position, and an operative connection between said operating member and motor for operation of the former during periodic operation of the latter.

2. A chuck including a support, a base ring secured to said support, a spindle rotatably mounted in said support, a chuck body secured to said spindle, jaws mounted for clamping movement on said body, a jaw actuator member slidably mounted on said body, an operative connection between said actuator member and jaws for operation of the latter by the former, means for imparting jaw closing movement to said actuator member, a chuck jaw operating member mounted for unlimited rotary movement on said ring independently of said chuck body, an operative connection between said operating member and said actuator member including a lip on one member extending into a groove wider than the lip on the other member to permit action of said jaw closing means independently of said actuator member, and means for rotating said operating member.

3. A chuck including a rotatably mounted body, chuck jaw members movable radially on said body and projecting beyond an outer surface thereof, a chuck jaw actuator member slidably mounted on an outer surface of said body, engaging means between said actuator member and the projecting portions of said chuck jaw members for imparting radial movement to said members by sliding movement of said actuator member, means for imparting jaw closing movement to said actuator member, an operating member for said actuator member, means for limiting movement of said actuator member, said means including a lip on one member extending into a groove wider than the lip on the other member to permit action of said jaw closing means independently of said actuator member, and means for rotating said body.

4. A chuck including a rotatably mounted body, chuck jaws movable radially on said body, a chuck jaw actuator of annular form completely surrounding and slidably mounted on said body and operatively connected with said jaws, bolts secured to said body and extending through said actuator springs carried by said bolts in contact with the outer edge of said actuator to force it in one direction, means for moving the actuator in the opposite direction, and means for rotating said body.

5. A chuck including a rotatably mounted body having an overhanging end, chuck jaws movable radially on said body, a chuck jaw actuator slidably mounted on said body underneath said overhanging end and having spring containing recesses, an operative connection between said actuator and jaws, springs located in said recesses and operating against said actuator to force it in one direction, means for moving said actuator in the opposite direction, and means for rotating said body.

6. A chuck including a rotatably mounted body having an overhanging end, chuck jaws movable radially on said body, a chuck jaw actuator slidably mounted on said body underneath said overhanging end and having spring containing recesses, an operative connection between said actuator and jaws, spring supports secured to said body and projecting through said recesses, springs seated on said supports within said recesses and operating to force the actuator toward said overhanging end, means for moving said actuator in opposition to the force of said springs, and means for rotating said body.

7. A chuck including an immovably mounted base ring having an annular groove therein, a jaw operating band having one edge located in said groove, means for circularly oscillating said band, a jaw operating ring screw-threadedly engaged with said band, a chuck body, chuck jaws movably mounted in said body, a chuck jaw actuator slidably mounted on said body and operatively connected with said jaws, said actuator being rotatable independently of said jaw operating ring but engaged therewith for operation thereby, and means for rotating said body.

8. A chuck including an immovably mounted base ring, a jaw operating band rotatably supported by said ring, means for operating said band, a chuck jaw operating ring screw-threadedly engaged with said band, a chuck body, chuck jaws movably mounted on said body, a chuck jaw actuator slidably mounted on said body and operatively connected with said jaws and having a shoulder, a lip on said chuck jaw operating ring engaged with said shoulder for operation of said actuator while permitting rotation thereof independently of said jaw operating ring, and means for rotating said body.

9. A chuck operating mechanism including a base ring having a motor support projecting therefrom, a motor mounted on said support, a chuck body supported in cooperative relation to said base ring, means for rotating said body, chuck jaws radially movable on said body, an actuator slidably movable on said body and operatively connected with said jaws, a jaw operating member rotatably mounted on said base ring and operatively connected with said actuator for operation thereof but to permit independent rotation of said actuator as effected by and during rotation of the chuck body to revolve the chuck jaws, and an operative connection between said jaw operating member and said motor to permit periodic operation of the latter independently of rotating movement of said chuck body.

10. A chuck including a rotatably mounted body having an overhanging end, chuck jaws movable radially on said body, a chuck jaw actuator slidably mounted on said body underneath said overhanging end and having spring containing recesses, an operative connection between said actuator and jaws, spring supports secured to said body and projecting through said recesses, springs seated on said supports within said recesses and operating to force the actuator in one direction, means for moving the actuator in the opposite direction in opposition to the force of said springs, and means for rotating said body.

11. A chuck including a frame, a base ring immovably secured to said frame and having a bearing groove therein, a bracket extending from the side of said frame, a motor mounted on said bracket and having a shaft extending to a position adjacent to said groove, a pinion on said shaft, a jaw operating band mounted in said groove and having a toothed flange engaged with said pinion, a jaw operating ring screw threadedly engaged with said band, a chuck body rotatably mounted within said jaw operating ring, a jaw actuator slidably mounted on said body and operatively engaged by said operating ring, and chuck jaws radially movable on said chuck body and operatively connected with said actuator.

12. A chuck including a rotatably mounted body, chuck jaws radially movable thereon, a chuck jaw actuator slidably mounted on said body, an operative connection between said actuator and said chuck jaws for operation of the latter, said actuator having a groove, an operating ring having a lip narrower than said groove and projecting thereinto to permit movement of said actuator independently of said ring, means for moving the actuator in one direction, said lip being separately engageable with opposite sides of said groove to permit movement of the actuator in one direction and to effect its movement in the opposite direction to operate said chuck jaws outwardly or inwardly depending upon the side of the groove with which said lip is engaged, and means for operating said ring.

13. A chuck including a rotatably mounted body having an overhanging end, supporting rods projecting from said overhanging end, springs supported on said rods, a chuck jaw actuator through which said rods project and having recesses into which said springs extend for operation of said actuator, said actuator having a groove, an operating ring having a lip narrower than said groove and projecting thereinto for engagement with either side of said groove to move said chuck jaws outwardly or inwardly depending upon the side of the groove with which said lip is engaged, and means for operating said ring.

HARRY E. SLOAN.
GEORGE A. HIGHBERG.